United States Patent
Armstrong

(10) Patent No.: US 9,477,041 B2
(45) Date of Patent: Oct. 25, 2016

(54) LOW STRAY LIGHT BEAM DUMP WITH FIBER DELIVERY

(75) Inventor: J. Joseph Armstrong, Fremont, CA (US)

(73) Assignee: KLA-Tencor Corporation, Milpitas, CA (US)

(*) Notice: Subject to any disclaimer, the term of this patent is extended or adjusted under 35 U.S.C. 154(b) by 138 days.

(21) Appl. No.: 13/184,669

(22) Filed: Jul. 18, 2011

(65) Prior Publication Data

US 2012/0026749 A1 Feb. 2, 2012

Related U.S. Application Data

(60) Provisional application No. 61/369,591, filed on Jul. 30, 2010.

(51) Int. Cl.
*G02B 6/24* (2006.01)

(52) U.S. Cl.
CPC .................... *G02B 6/243* (2013.01)

(58) Field of Classification Search
CPC ........ G02B 6/02; G02B 6/243; G02B 6/262; G02B 6/266; G02B 5/003; G02B 5/0221; G02B 27/00; H01S 3/00; H01S 3/005
USPC ........... 359/614; 385/139–140; 362/553–554
See application file for complete search history.

(56) References Cited

U.S. PATENT DOCUMENTS

| | | | |
|---|---|---|---|
| 3,648,056 A * | 3/1972 | Buttweiler | G01J 1/06 250/228 |
| 4,864,098 A | 9/1989 | Basanese et al. | |
| 5,221,840 A * | 6/1993 | Boutet | H04N 1/0281 250/228 |
| 5,745,293 A * | 4/1998 | Lassalle | 359/614 |
| 5,809,198 A * | 9/1998 | Weber | G02B 6/243 385/139 |
| 6,643,447 B2 * | 11/2003 | Guy | G02B 6/3849 385/139 |
| 6,758,568 B2 * | 7/2004 | Valenti | 359/614 |
| 6,775,315 B1 | 8/2004 | Nield et al. | |
| 7,293,886 B2 * | 11/2007 | Holmgren | G02B 27/0018 359/614 |
| 2003/0002844 A1* | 1/2003 | DeRosa et al. | 385/139 |
| 2003/0215207 A1* | 11/2003 | DeRosa | G02B 6/243 385/139 |

(Continued)

FOREIGN PATENT DOCUMENTS

| JP | S61-88101 U | 5/1986 |
|---|---|---|
| JP | H06-252484 A | 9/1994 |

(Continued)

*Primary Examiner* — Bumsuk Won
*Assistant Examiner* — Jeffrey Madonna
(74) *Attorney, Agent, or Firm* — Suiter Swantz pc llo

(57) ABSTRACT

The present invention is directed to a beam dump which is configured for not increasing a temperature of a laser with which it may be implemented. The beam dump may include an opaque enclosure which is configured for receiving light (ex.—initial light) from a light source (ex.—a frequency-converted laser), said light being delivered through an aperture of the enclosure via one or more connected optical fibers. The received light may be scattered within the enclosure. However, the beam dump is configured for minimizing the amount of light which is back scattered light into the fiber(s). For instance, the amount of back scattered light may be less than $\frac{1}{1000}$ of the initial light. Further, the beam dump may be configured for minimizing photocontamination which may be caused when the light contacts interior surfaces of the enclosure. Still further, the beam dump may be a small size, low cost structure.

17 Claims, 11 Drawing Sheets

(56) References Cited

U.S. PATENT DOCUMENTS

| | | | |
|---|---|---|---|
| 2005/0123019 A1* | 6/2005 | Stewart et al. | 372/108 |
| 2009/0185776 A1* | 7/2009 | Kato | G02B 5/003 385/16 |
| 2009/0279574 A1 | 11/2009 | Gapontsev | |
| 2010/0175454 A1 | 7/2010 | Eigler et al. | |

FOREIGN PATENT DOCUMENTS

| | | |
|---|---|---|
| JP | 2003-080390 A | 3/2003 |
| JP | 2007-207856 A | 8/2007 |

\* cited by examiner

LOW STRAY LIGHT BEAM DUMP WITH FIBER DELIVERY

CROSS-REFERENCE TO RELATED APPLICATIONS

The present application claims priority under 35 U.S.C. §119(e) to U.S. Provisional Application No. 61/369,591 entitled: Low Stray Light Beam Dump with Fiber Delivery filed Jul. 30, 2010, which is hereby incorporated by reference in its entirety.

FIELD OF THE INVENTION

The present invention generally relates to illuminators used in conjunction with inspection systems, such as semiconductor wafer inspection systems and photomask inspection systems, and more particularly to a frequency converted light source for use with such inspection systems.

BACKGROUND OF THE INVENTION

Currently available illuminators (ex.—laser systems; lasers) utilized in conjunction with inspection systems (ex.—semiconductor wafer inspection systems and photomask inspection systems) typically handle residual light from frequency conversion processes by sending the residual light into an absorbing medium or beam dump. These currently implemented laser systems may experience problems such as: excess generated heat, excess scattered light and photocontamination, which may compromise stability and performance of the laser systems.

Thus, it would be desirable to provide a beam dump that would not increase the temperature of the laser, would have acceptably low levels of scattered light, would have minimum photocontamination, would be low cost and would be small in size.

SUMMARY OF THE INVENTION

Accordingly an embodiment of the invention is directed to a beam dump, including: an enclosure, the enclosure configured for being connected to at least one optical fiber, the enclosure configured with an aperture (ex.—the aperture area may be less than 1/1000 of a surface area of the enclosure) for receiving light into an interior of the enclosure via at least one optical fiber, said light being transmitted from a remotely-located light source into the enclosure via the at least one optical fiber, wherein the enclosure is configured for at least substantially containing the received light within the enclosure. The received light may impinge on an internal surface of the enclosure. The internal surface may be configured for reflecting, scattering and/or absorbing the impinging light. For instance, the internal surface of the enclosure may include a roughened (ex.—bead-blasted) portion, a metal portion and/or a portion that is coated with a light-absorbing material (ex.—the light-absorbing material having a light absorption level/percentage of greater than 10%). The received light may be residual pump light from a laser oscillator, residual pump light from an amplifier, and/or residual light from a frequency-conversion process. The enclosure may be an opaque enclosure and may be formed of a metal, such as extruded aluminum.

A further embodiment of the present disclosure is directed to a beam dump, including: an enclosure, the enclosure configured for being connected to at least one optical fiber, the enclosure configured with an aperture for receiving light into an interior of the enclosure via at least one optical fiber, said light being transmitted from a remotely-located light source into the enclosure via the at least one optical fiber; and at least one tapered structure, the at least one tapered structure being located within the interior of the enclosure, wherein the received light impinges on the at least one tapered structure, the at least one tapered structure being configured for one of: spreading the impinging light over a surface of the at least one tapered structure; reflecting the impinging light; scattering the impinging light; and/or absorbing the impinging light, wherein the enclosure is configured for at least substantially containing the received light within the enclosure. In exemplary embodiments, a first tapered structure and second tapered structure may be implemented within the enclosure and may be configured so that the light received by the enclosure passes through an aperture in the first tapered structure and impinges on the second tapered structure. For instance, the aperture in the first tapered structure may be sized for causing the light to pass through the first tapered structure at a desired angle of divergence for promoting increased distribution of the light along a surface area of the second tapered structure. The tapered structure(s) may be formed of a thermally-conductive material, aluminum, copper, stainless steel, a metal alloy, carbon, and/or graphite. In further embodiments, the tapered structure(s) may be at least partially coated with metal, nickel, silver and/or gold. In further embodiments, the tapered structure(s) may include a roughened surface (ex.—a bead-blasted surface). In still further embodiments, the tapered structure(s) may be multi-sided and/or conical structure(s). In further embodiments, the tapered structure(s) may have a light absorption percentage of greater than 10%.

A still further embodiment of the present disclosure is directed to a beam dump, including: an enclosure, the enclosure configured for being connected to at least one optical fiber, the enclosure configured with an aperture for receiving light into an interior of the enclosure via at least one optical fiber, said light being transmitted from a remotely-located light source into the enclosure via the at least one optical fiber; at least one tapered structure, the at least one tapered structure being located within the interior of the enclosure, wherein the received light impinges on the at least one tapered structure, the at least one tapered structure being configured for one of: spreading the impinging light over a surface of the at least one tapered structure; reflecting the impinging light; scattering the impinging light; and absorbing the impinging light; and at least one volume absorber, the at least one volume absorber being located within the interior of the enclosure, the at least one volume absorber being configured for absorbing the light, wherein the enclosure is configured for at least substantially containing the received light within the enclosure. In exemplary embodiments, the volume absorber(s) may be: liquid volume absorber(s), formed of glass, formed of mesh, formed of steel wool, and/or formed of copper wool. In further embodiments, the beam dump may include a cooling structure which may be connected to an external surface of the enclosure. The cooling structure may be configured for decreasing a surface temperature of the enclosure. For example, the cooling structure may be: a fan, a heat pipe cooling structure, a thermoelectric cooling structure, heat-radiating fins, and/or a liquid cooling structure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
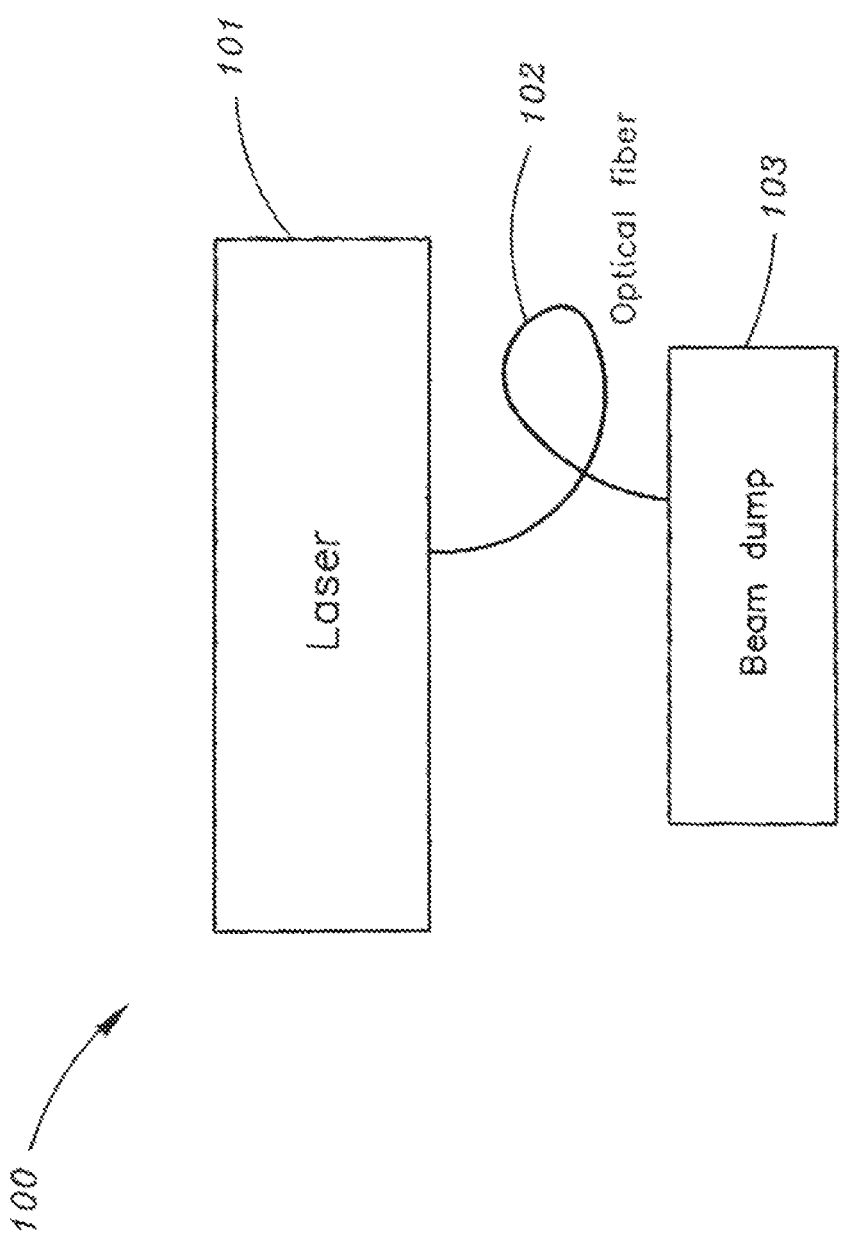
FIG. 1 is a block diagram schematic of a laser system in accordance with an exemplary embodiment of the present disclosure, the laser system including a laser connected to a beam dump via an optical fiber.

Reference will now be made in detail to the presently preferred embodiments of the invention, examples of which are illustrated in the accompanying drawings.

The demands of the semiconductor industry for wafer and photomask inspection systems exhibiting high throughput and improvements in resolution are ongoing. Successive generations of such inspection systems tend to achieve higher resolution by illuminating the wafer or reticle using light energy having high power (ex.—deep ultraviolet (DUV) light energy). The primary method to provide adequate DUV power entails generating shorter wavelength light from longer wavelength light. This process of changing wavelengths is commonly called frequency conversion. Frequency conversion requires high peak power light and/or high average power light in order to produce a nonlinear response in an optical crystal. The original light is typically called fundamental light.

Controlling the light within the frequency conversion system is very important and challenging. Stable laser operation requires stable laser temperatures. Stable laser operation also requires the ability to minimize stray light, which can interfere with built-in diagnostics such as laser power measurement. The frequency conversion process can be very inefficient. For example, the process of converting fundamental light to second harmonic light is often less than 50% efficient, thus leaving 50% of the fundamental light (ex.—unwanted light, residual light) remaining. Further, if fourth harmonic light is desired, the process of converting second harmonic light to fourth harmonic light can be less than 10% efficient, thus leaving 90% second harmonic light (ex.—residual light) remaining to deal with.

Currently available laser systems (ex.—lasers) handle residual light by sending the residual light into an absorbing medium or beam dump. This can cause significant problems with generated heat and scattered light. For example, high-powered lasers can easily heat up an air-cooled beam dump to 100 degrees Celsius. A solution which is currently utilized for attempting to overcome this problem is to implement water cooling to remove heat from the beam dump. However, water-cooled beam dumps can be very large, very expensive, and/or unreliable. As mentioned above, sending residual light to a beam dump may also cause significant problems with scattered light. For instance, currently available beam dumps may have backscattered light greater than 1 part in 1000. This is insufficient for isolating low power detectors with sensitivities of 1 picowatt (pW)/cm$^2$ or less.

Further, when generating high power ultraviolet (UV) or deep ultraviolet (DUV) light, another significant problem experienced by a number of currently available inspection systems (ex.—laser systems) implementing beam dumps may be photocontamination. For instance, outgassing and contamination from materials in beam dumps, particularly the absorbing coatings, is an undesirable and/or unacceptable characteristic for laser systems. It would therefore be desirable to have a beam dump that would not increase the temperature of the laser, would have scattered light that is much less than $\frac{1}{1000}^{th}$ of the initial light, would have minimum photocontamination, would be low cost and would be small in size.

U.S. Pat. No. 4,864,098 by Basanese et al. (hereinafter: Basanese), presents a typical high power beam dump for use with a carbon dioxide laser with a 10.6 micron wavelength. The beam dump disclosed in Basanese is water cooled and uses the outside surface of a reflective cone element to reflect the beam to an absorber. The beam dump disclosed in Basanese would typically be implemented in machining applications, where small amounts of stray light would not be a concern. However, the beam dump disclosed in Basanese has significant amounts of reflected and scattered light when used at wavelengths less than 2 microns. Further, the beam dump disclosed in Basanese is not enclosed and is not capable of direct fiber delivery of the incident light. In addition, the water cooling implemented with the beam dump disclosed in Basanese may still allow for significant temperature rise in the area of the beam dump.

U.S. Pat. No. 6,775,315 by Nield et al. (hereinafter: Nield), presents a system for controlling a medical laser that includes an air cooled beam dump mounted to the outside of an optical system. The system disclosed in Nield is designed to switch input light from an optical fiber between an output optical fiber or a beam dump. In Nield, the beam dump is air cooled and uses the inner portion of an absorbing cone. However, using the inner surface of a cone limits the number of reflections and hence the amount of light that can be absorbed before it exits the cone area. Further, using the inner surface of a cone does not effectively disperse high power light, which can damage the absorbing coating. These characteristics make the beam dump disclosed in Nield unsuitable for high power light and long lifetimes. Still further, the beam dump of Nield is enclosed on one side by a transparent window so that a significant portion of the scattered and reflected light will escape. Further, the beam dump of Nield is mounted directly to the optical assembly and any heating will be directly transferred to the assembly. Since the beam dump in Nield is directly connected to the optical system, any heat generated will still transfer to the housing of the optical system. Even a laser power of 10 W can cause a temperature rise of 20 deg C. when implementing the beam dump disclosed in Nield.

The present disclosure discloses a plurality of beam dump (ex.—remote enclosure) embodiments which may be implemented with a light source and may be configured for containing light from the light source which is delivered to the beam dump via fiber delivery (ex.—via optical fibers). These remote enclosures effectively provide mechanisms for removing the source of heat and scattering away from the light source. In addition, the remote enclosures disclosed herein may remove an important source of photocontamination. Photocontamination limits the lifetime of laser sources with wavelengths less than 400 nanometers (nm). To minimize the impact of photocontamination, nickel coated aluminum and stainless steel are may be used in constructing the remote enclosures. Further, it may also desirable to have parts of the enclosures electropolished and/or to have parts of the enclosures undergo a special cleaning process in order to minimize any remaining surface contamination. This may add significant cost to any part that is designed for such conditions. For this reason, the beam dump (ex.—remote enclosure) embodiments disclosed herein may be preferable for use implementation with a laser, such as with a high power frequency converted laser.

Referring to FIG. 1, a laser system 100 in accordance with an exemplary embodiment of the present disclosure is shown. The laser system 100 includes a laser enclosure (ex.—laser) 101. The laser system 100 further includes a remote enclosure (ex.—beam dump) 103. The laser 101 is connected to the beam dump 103 via an optical fiber 102. Residual light from the laser 101 is directed into (ex.—transmitted into; coupled into) the optical fiber 102, and said optical fiber 102 guides the residual light to the beam dump 103. Residual light is light that would otherwise need to be absorbed inside the laser 101 or transmitted by free propagation outside the laser 101. This residual light can be pump light for an optical oscillator or amplifier, or light that is part of a frequency conversion process.

An exemplary frequency conversion process would be generation of 532 nm light from 1064 nm light using a suitable nonlinear crystal. In such case, 40% of the 1064 nm light may be converted to 532 nm light, leaving 60% of the 1064 nm light, this 60% being the residual light. This residual 1064 nm light can be focused into optical fiber 102, which is configured for guiding the residual light to remote enclosure 103 (ex.—beam dump). Remote enclosure 103 is configured for absorbing the residual light from laser 101 delivered by fiber 102. Because the beam dump 103 is remotely located from the laser 101, the laser system 100 shown in FIG. 1 effectively isolates the laser 101 from the increased heat load and scattered light which may be produced during frequency conversion, and also isolates the laser 101 from a source of photocontamination. Further, because the remote enclosure 103 is external to laser 101 and thus, is in a non-critical location relative to the laser 101, it may be possible to greatly reduce the cost of the beam dump 103. This may be especially true with laser systems 100 which implement very high power residual light. In still further embodiments, the laser system 100 may incorporate a cooling element. The cooling element (not shown) may be attached to the remote enclosure 103. Possible cooling elements may include and/or may implement heat pipe coolers, thermoelectric coolers, forced air cooling, and liquid cooling.

Figure 2:
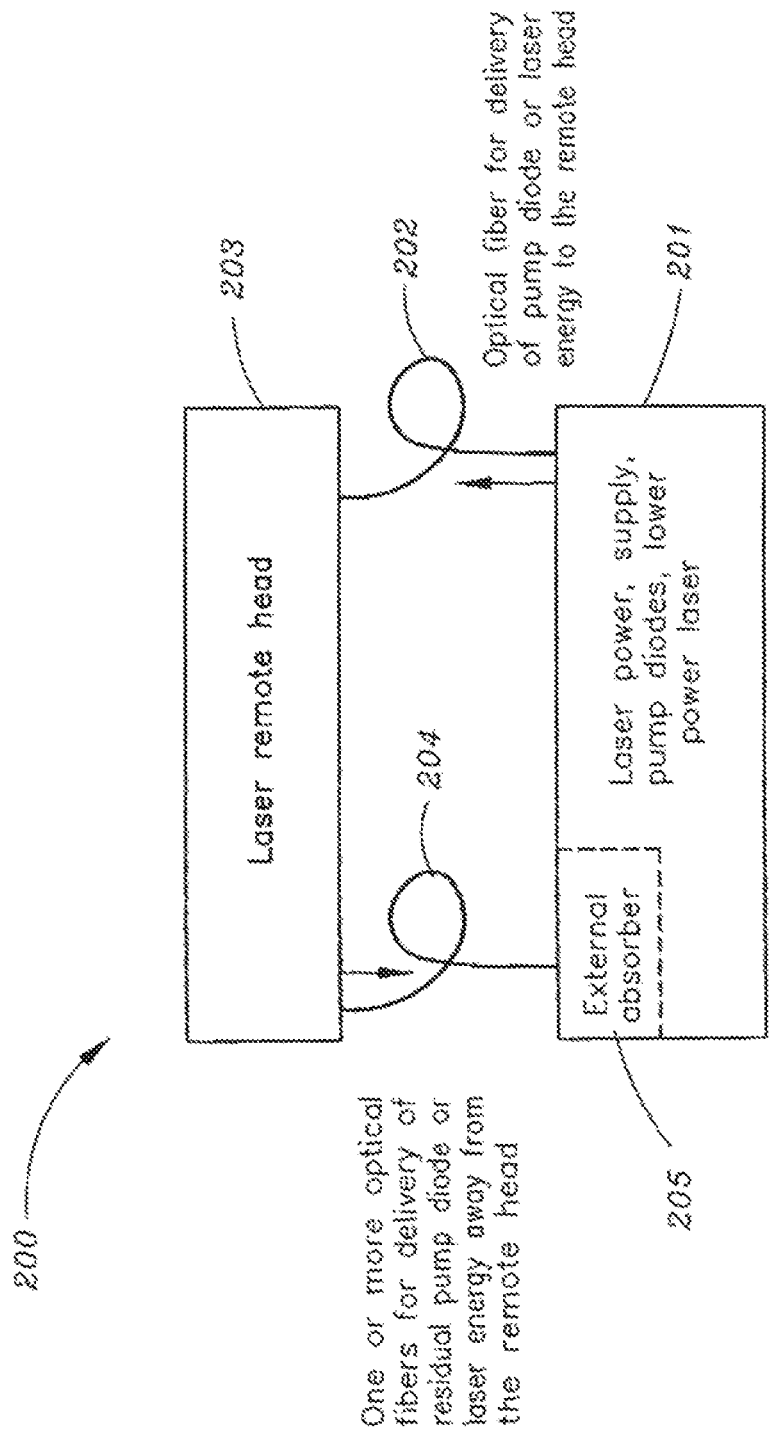
FIG. 2. is a block diagram schematic of a laser system in accordance with a further exemplary embodiment of the present disclosure.

Referring to FIG. 2, a laser system 200 in accordance with a further exemplary embodiment of the present disclosure is shown. The laser system 200 includes a laser power supply 201. The laser system 200 further includes a laser head (ex.—laser remote head; laser) 203, which is located remotely from the laser power supply 201. The laser remote head 203 is connected to the laser power supply via an optical fiber 202. In further embodiments, the laser power supply 201 may include (ex.—may contain) pump diodes, and/or a laser oscillator and pre-amplifier (ex.—which may be implemented when using a laser 203 based on a fiber laser oscillator. In exemplary embodiments, the laser system 200 may further include an enclosure (ex.—external absorber) 205 which may be connected to the remote head 203 via one or more optical fibers 204. For instance, the enclosure 205 may be separated from (ex.—remotely located from) the power supply 201, or may be integrated with the power supply 201.

In exemplary embodiments, pump light or initial laser light is transferred from power supply 201 to remote head 203 via fiber 202. Further, the one or more optical fibers 204 may be used to deliver residual light from remote head 203 to external absorber 205. In many cases it may be desirable to bundle the optical fibers for delivery of pump or laser energy 202 with the optical fibers for delivery of residual light energy 204 together. The optical fibers can also be bundled with any control or power cables. This simplifies the routing of many cables between laser power supply 201 and laser remote head 203.

Figure 3:
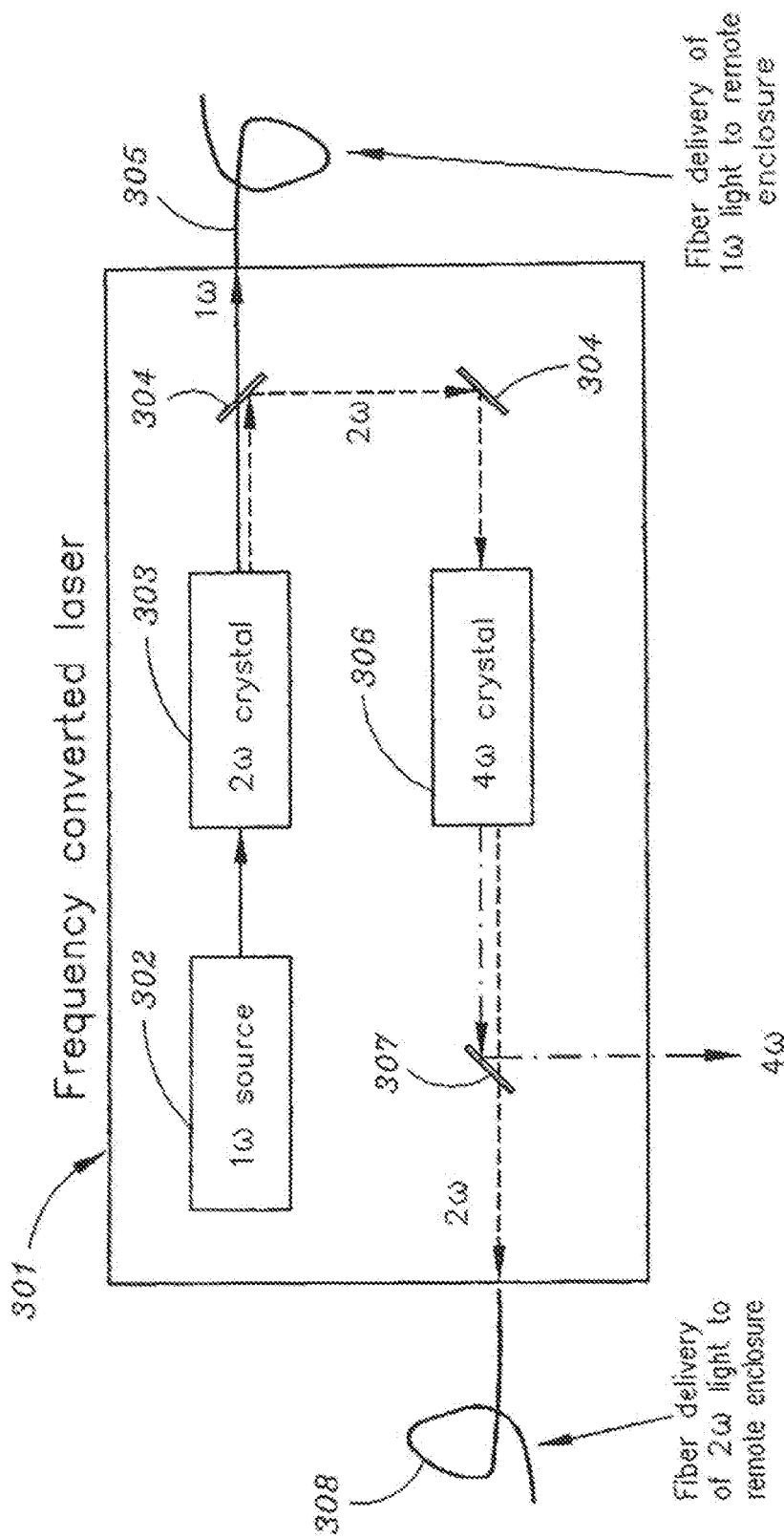
FIG. 3 is a block diagram schematic of a laser (ex.—a frequency converted laser) which may be implemented in the laser system(s) of FIGS. 1 and 2 in accordance with an exemplary embodiment of the present disclosure.

Referring to FIG. 3, a laser 301 (ex.—a frequency converted laser 301) which may be implemented in the laser system(s) (100, 200) discussed above is shown, in accordance with an exemplary embodiment of the present disclosure. For example, frequency converted laser 301 may be configured as a mostly self-contained laser (ex.—may be a laser enclosure 101 as shown in FIG. 1) or may be a remote head 203 (as shown in FIG. 2). The frequency converted laser is configured for performing a two-step frequency conversion process where light from a first source 302 at a first frequency (ex.—frequency 1ω) is partially converted to second harmonic light at a second (ex.—higher) frequency (ex.—frequency 2ω) using a non-linear crystal 303. Additional optics (not shown) may be used to modify the polarization, spatial profile, or temporal profile of the light. Frequency conversion processes and mixing processes are not 100% efficient and residual light at frequency 1ω remains. Typical frequency doubling efficiencies are 40-50%, thus leaving 50-60% residual 1ω light. In the embodiment of the frequency converted laser 301 shown in FIG. 3, the residual 1ω light is separated from the 2ω frequency light by using a dichroic mirror 304, however other techniques for performing such separation are possible.

In further embodiments of the present disclosure, residual 1ω light may be focused from the laser 301 into an optical fiber 305 which transports the residual 1ω light from the laser to a remote enclosure (such as remote enclosure 103). The light at frequency 2ω is then subsequently converted to 4ω light using another nonlinear crystal 306. Typical frequency doubling efficiency from 2ω to 4ω is 5-10%. This leaves 90-95% residual 2ω light. In the embodiment of the frequency converted laser 301 shown in FIG. 3, the residual 2ω light may be separated from the 4ω frequency light by using dichroic mirror 307. The residual 2ω light is then transported to a remote enclosure (not shown) via fiber 308. In exemplary embodiments, the residual 1ω light and the residual 2ω light may be sent to the same remote enclosure. Other frequency conversion and mixing processes can also utilize the above-described technique for removing residual light produced by the frequency conversion or mixing process.

Figure 4:
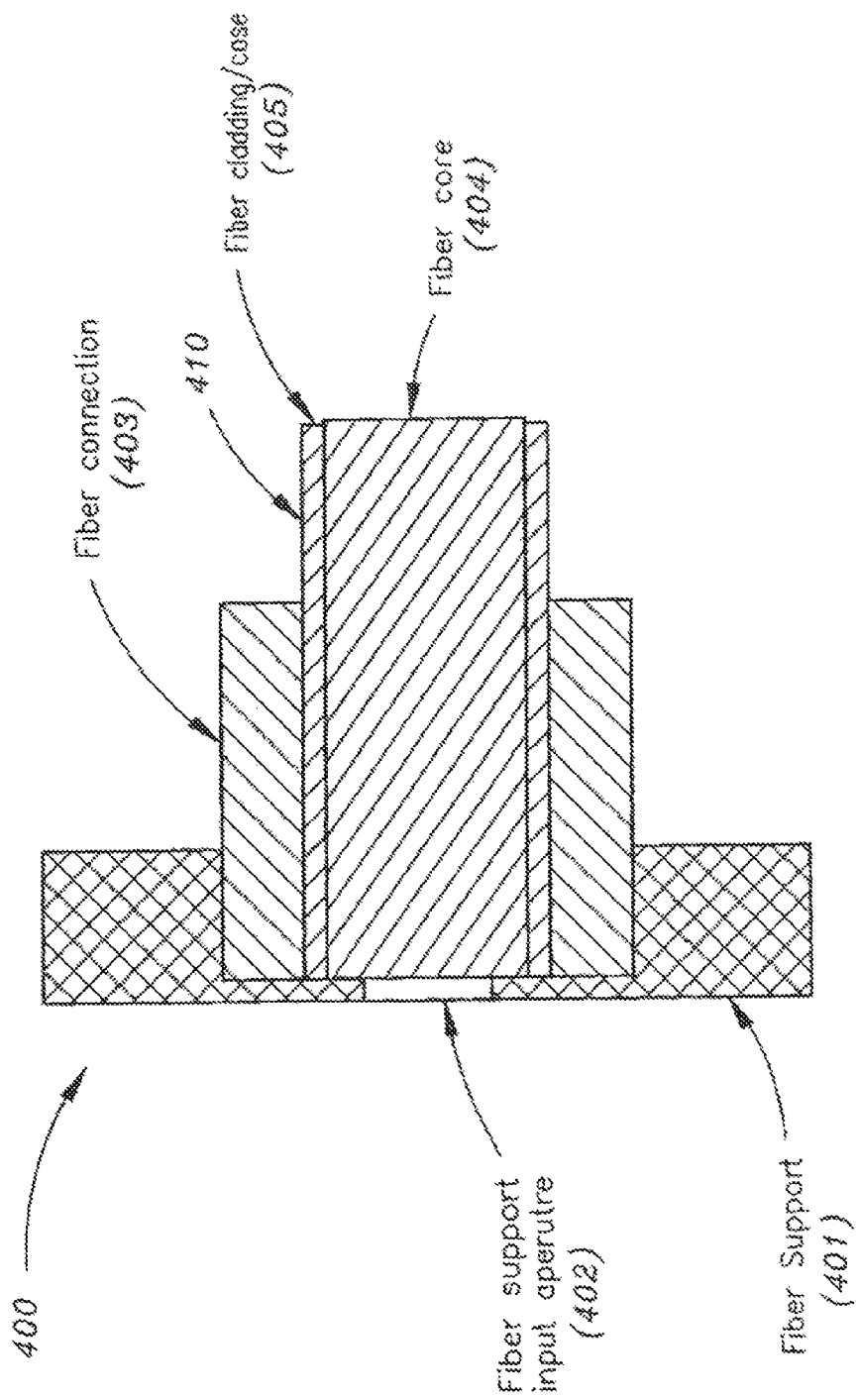
FIG. 4 is a cross-sectional view of an interconnect for a laser and an optical fiber in accordance with an exemplary embodiment of the present disclosure.

Referring to FIG. 4, an interconnect 400 for a laser (such as a remote head 203 or laser enclosure 101) and an optical fiber 410 is shown in accordance with an exemplary embodiment of the present disclosure. In exemplary embodiments of the present disclosure, the interconnect 400 may include a fiber support 401. For example, the fiber support 401 may be a portion of (ex.—side panel of) a laser enclosure 101 or remote head 203 or may be a separate structure attached to the laser enclosure 101 or remote head 203. Further, the fiber 410 is connected to the fiber support 401 and is configured for carrying residual light energy from a laser to a remote enclosure. In exemplary embodiments, an input aperture 402 formed in the fiber support 401 may have a diameter which is equal or less than a diameter of a fiber core 404 of the fiber 410. This may be advantageous in that it may prevent high power light from damaging fiber cladding 405 of the fiber 410.

In further embodiments of the present disclosure, the fiber support 401, fiber core 404, fiber cladding/case 405 and/or any adhesives implemented in the interconnect 400 may be configured so as to be suitable for use in low photocontamination environments. For example, ideal materials implemented in the structures may be nickel-coated aluminum and stainless steel. In still further embodiments, It may be advantageous to place an o-ring seal between the fiber connector 403 and fiber support structure 401 to prevent outside contamination from entering the laser. The fiber core 404 (ex.—a surface or face) of the fiber 410 may be a bare surface or may be Anti-Reflection (AR)-coated to prevent reflections. AR coatings may dramatically reduce light reflected from the surface of the fiber 410 but can increase costs. It is also possible to tilt the surface of the fiber 410 relative to an optical axis of the input light, thereby allowing for any low power reflected light to be effectively directed to a secondary absorber within the laser or remote head.

Figure 5:
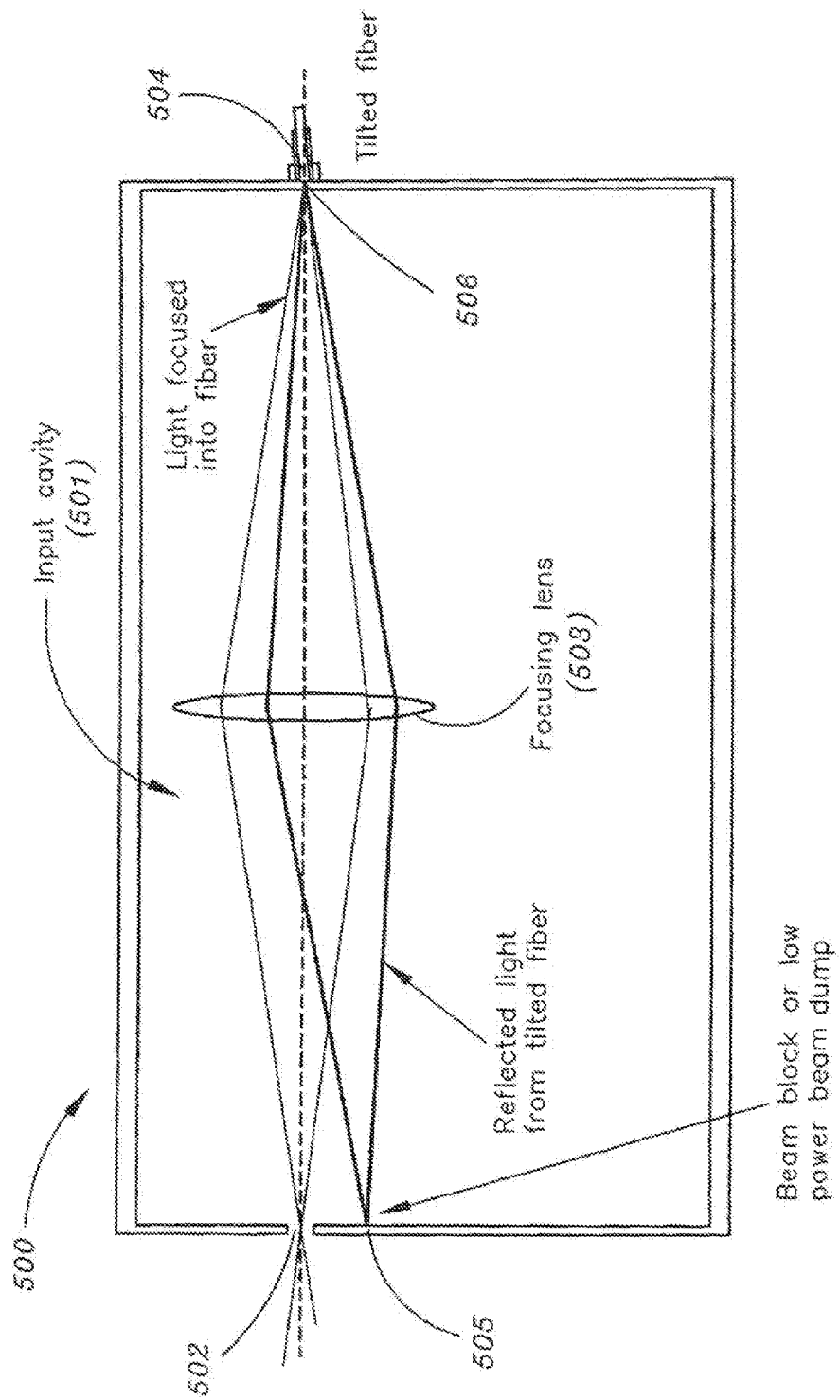
FIG. 5 is a block diagram schematic of a fiber support, which may be configured for interconnecting a remote head or laser enclosure and an optical fiber, in accordance with a further exemplary embodiment of the present disclosure.

Referring to FIG. 5, a fiber support 500 (which may be configured for interconnecting a remote head 203 or laser enclosure 101 and an optical fiber 504) is shown, in accordance with a further exemplary embodiment of the present disclosure. As mentioned above, fiber support 401 may be a separate structure attached to the laser enclosure 101 or remote head 203, such as the fiber support 500 shown in FIG. 5. In exemplary embodiments, the fiber support 500 is configured for reducing an amount of stray light reflected off a fiber face 504. In further embodiments, the fiber support 500 forms an input cavity 501. Light from a connected laser enclosure 101 or remote laser head 203 may enter the input cavity 501 of the fiber support 500 via a small (ex.—1-2 millimeters in diameter) aperture 502 formed in/through a surface of the fiber support 500. The diameter of the aperture 502 may be configured to be several times the diameter of the focused beam, so position errors or shifts in the position of the focus do not touch the edge of the aperture 502. In further embodiments, light entering the input cavity 501 via aperture 502 travels to a lens 503 which is configured within the input cavity 501. The light is then refocused by the lens 503 into fiber (ex.—optical fiber) 504. Fiber 504 can be configured in a manner similar to optical fiber 410 described above.

In exemplary embodiments, the fiber support 500 may have formed therein a fiber input aperture 506. Light refocused by the lens 503 may be directed through the fiber input aperture 506 into the fiber 504. The fiber input (ex.—the fiber input aperture 506 and fiber 504) may be tilted sufficiently so that reflected light refocused by lens 503 within the input cavity 501 misses aperture 502 and focuses on an internal surface 505 of the fiber support 500. This focus location (ex.—internal surface 505) may be a bare metal surface configured for scattering and reflecting light, or it may be a secondary absorber.

Figure 6:
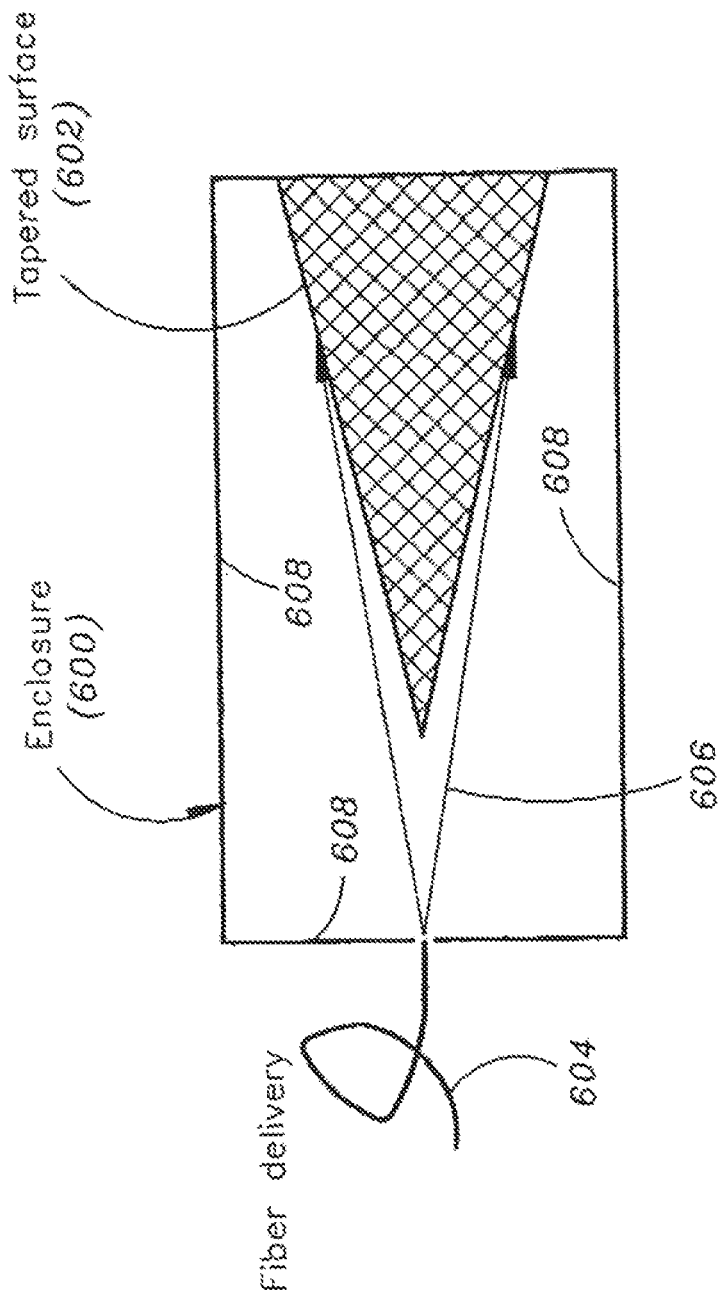
FIG. 6 is a block diagram schematic of a remote enclosure (ex.—beam dump; beam dump enclosure) in accordance with a further exemplary embodiment of the present disclosure, the beam dump enclosure including fiber delivery and a single tapered structure.

Referring to FIG. 6, a remote enclosure (ex.—beam dump; beam dump enclosure) 600 in accordance with a further exemplary embodiment of the present disclosure is shown. In exemplary embodiments, the enclosure 600 includes a tapered structure 602 for receiving light by fiber delivery (ex.—via optical fiber 604). Fiber 604 may be attached to enclosure 600 using a standard fiber connector. Enclosure 600 may be made from a variety of materials including, but not limited to metals. For instance, extruded aluminum may be a good choice as a material for the enclosure 600 because it may allow for construction of the enclosure 600 to be very inexpensive. In exemplary embodiments, an internal area of the enclosure 600 may be greater than 1,000 times the area of a fiber output surface. For example, the internal area of the enclosure 600 may be greater than 1,000,000 times the area of the fiber output surface.

In further embodiments of the present disclosure, light 606 exiting fiber 604 may diverge and impinge on the tapered structure (ex.—a tapered surface) 602. For instance, the tapered structure 602 may be a conical structure and/or a multisided structure. The tapered structure 602 may be designed to spread as much of the incident light power as possible over a surface area of the tapered structure 602. This may help to reduce power density and potential damage to the structure (ex.—surface) 602. When implementing high powered light 606, it may be desirable to have the tapered surface 602 be constructed of a material with high thermal conductivity such as copper, aluminum or an alloy containing one or more of these materials. Another material which may be used in constructing the tapered structure may be stainless steel, however, the thermal conductivity of stainless steel is much less than either copper or aluminum.

When implementing high powered light 606, it may be desirable to have the tapered surface 602 reflect a substantial portion of the incident light 606. This may prevent damage to the surface of the tapered structure (ex.—tapered element) 602. For example, by coating the tapered surface 602 with nickel, a substantial portion of the incident light 606 may be reflected and thus, damage to the surface of the tapered structure 602 may be prevented. In further embodiments, It is also possible for the tapered surface 602 to have enhanced light scattering. Creating a tapered surface 602 which provides enhanced light scattering may be accomplished by bead blasting or using some other technique to increase the roughness of the tapered surface 602. In still further embodiments, it is also possible for the tapered surface 602 to be constructed so as to be a light absorbing surface, however, this is generally only recommended when low power light is being implemented.

In exemplary embodiments of the present disclosure, when the light 606 scatters and reflects from the tapered surface 602, said light 606 may contact interior surface(s) 608 of the enclosure 602. In an embodiment of the present disclosure, the interior surface(s) 608 of the enclosure 602 may be bare metal, metal with enhanced surface roughness, or metal coated with an absorber. In further embodiments, a volume absorber may be positioned inside the enclosure 600. For instance, the volume absorber may be a liquid, glass, or mesh structure. When the light 606 being implemented is infrared wavelength light, water may be a good choice for a liquid volume absorber. In further embodiments, specialty glass types may be implemented in the volume absorber which may be suitable for absorbing a variety of wavelengths. In still further embodiments, steel or copper wool may be a good choice for a volume absorber. In further embodiments, additional tapered structures may be used inside the enclosure 600 to enhance light absorption and/or to prevent light from re-entering the fiber 604.

Surface temperature of the enclosure 600 may increase to over 50 degrees Celsius when high light levels are being implemented and when a surface area of the enclosure is small. By increasing an external surface area of the enclosure 600 the temperature of the enclosure may be greatly reduced. In further embodiments, the enclosure 600 may be cooled through implementation of a fan, a heat pipe cooler, a thermoelectric cooler, and/or via liquid cooling. Because the enclosure 600 may be implemented in a system in which said enclosure 600 may be located remotely from a laser or remote head, it may be much easier to implement cooling without impacting the performance of the laser. Still further, cooling can also be done without photocontamination problems.

Figure 7:
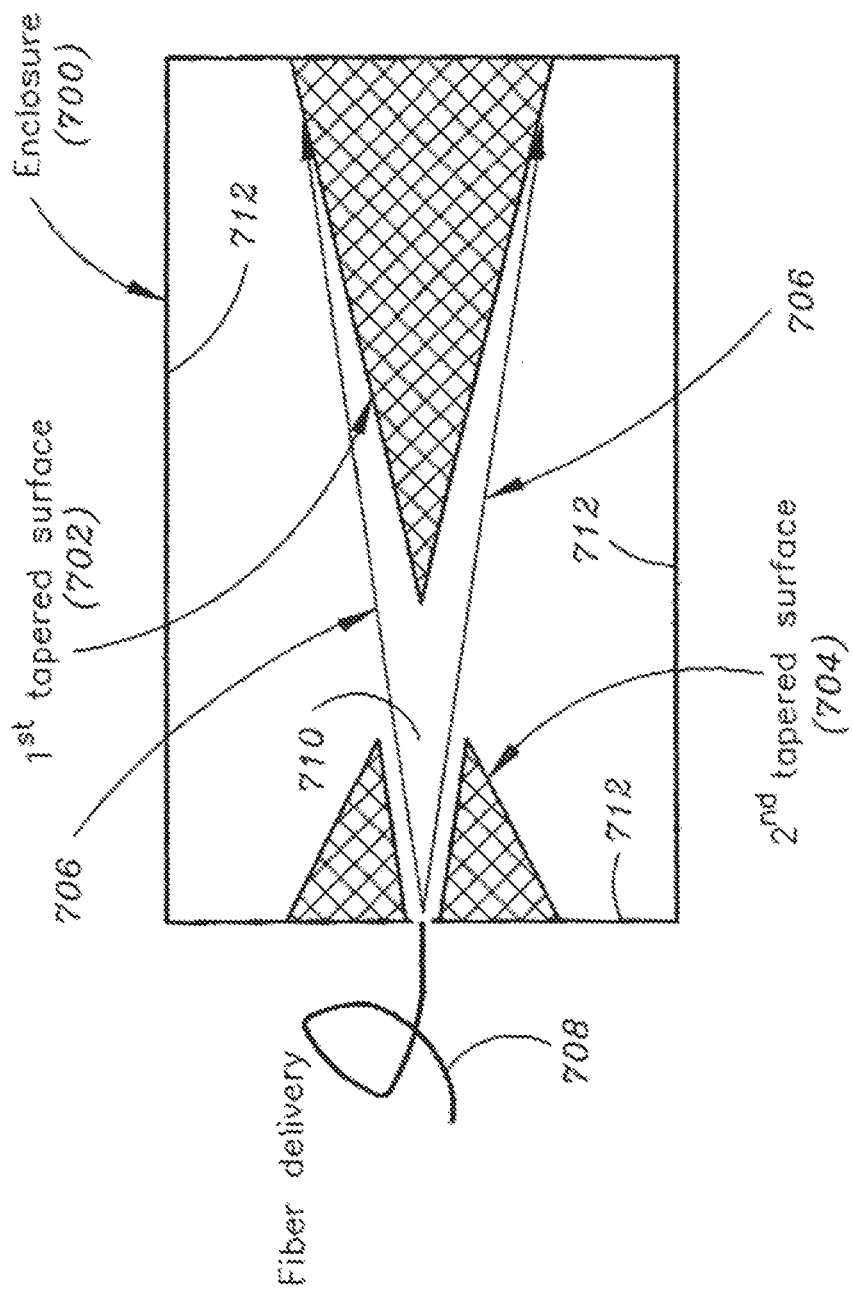
FIG. 7 is a block diagram schematic of a beam dump enclosure in accordance with a further exemplary embodiment of the present disclosure, the beam dump enclosure including fiber delivery and multiple tapered structures.

Referring to FIG. 7, a remote enclosure (ex.—beam dump) 700 in accordance with a further exemplary embodiment of the present disclosure is shown. In exemplary embodiments of the present disclosure, a first tapered structure 702 and a second tapered structure 704 are implemented within (ex.—connected to) the enclosure 700 for receiving light 706 which is provided to the enclosure 700 by fiber delivery (ex.—via optical fiber 708). Fiber 708 may be attached to enclosure 700 using a standard fiber connector. Enclosure 700 may be made from a variety of materials including, but not limited to metals. For instance, extruded aluminum may be a good choice as a material for the enclosure 700 because it may allow for construction of the enclosure 700 to be very inexpensive. In exemplary embodiments, an internal area of the enclosure 700 may be greater than 1,000 times the area of a fiber output surface. For example, the internal area of the enclosure 700 may be greater than 1,000,000 times the area of the fiber output surface. Light 706 exiting fiber 708 may diverge and pass through an aperture 710 in the second tapered structure (ex.—second tapered surface) 704 and may impinge on the first tapered structure (ex.—first tapered surface) 702. The addition of the second tapered surface 704 in this embodiment reduces an amount of the light 706 which may be scattered and reflected back into fiber 708.

As mentioned above, once the light 706 passes through an aperture 710 formed in the second tapered surface 704, the light may impinge on the first tapered surface 702. In exemplary embodiments, the first tapered surface 702 may be designed to spread as much of the incident light power as possible over a surface area of the first tapered surface 702. This may help to reduce power density and potential damage to the first tapered structure (ex.—first tapered surface) 702. When implementing high powered light 706, it may be desirable to have the first tapered surface 702 be constructed of a material with high thermal conductivity such as copper, aluminum or an alloy containing one or more of these materials. Another material which may be used in constructing the first tapered structure 702 may be stainless steel, however, the thermal conductivity of stainless steel is much less than either copper or aluminum.

When implementing high powered light 706, it may be desirable to have the first tapered surface 702 reflect a substantial portion of the incident light 706. This may prevent damage to the surface of the tapered structure (ex.—tapered element) 702. For example, by coating the first tapered surface 702 with nickel, a substantial portion of the incident light 706 may be reflected and thus, damage to the surface of the first tapered structure 702 may be prevented. In further embodiments, it is also possible for the first tapered surface 702 to have (ex.—to be configured for and/or to be constructed for providing) enhanced light scattering. Creating a tapered surface 702 which provides enhanced light scattering may be accomplished by bead blasting or using some other technique to increase the roughness of the tapered surface 702. In still further embodiments, it is also possible for the first tapered surface 702 to be constructed so as to be a light absorbing surface, however, this is generally only recommended when low power light is being implemented.

In exemplary embodiments of the present disclosure, when the light 706 scatters from and reflects off of the first tapered surface 702, said light 706 may contact interior surface(s) 712 of the enclosure 700. In an embodiment of the present disclosure, the interior surface(s) 712 of the enclosure 700 may be formed of bare metal, metal with enhanced surface roughness, or metal coated with an absorber. In further embodiments, a volume absorber may be positioned inside the enclosure 700. For instance, the volume absorber may be a liquid, glass, or mesh structure. When the light 706 being implemented is infrared wavelength light, water may be a good choice for a volume absorber which is a liquid structure (ex.—a liquid volume absorber). In further embodiments, specialty glass types may be implemented in the volume absorber which may be suitable for absorbing a variety of wavelengths. In still further embodiments, steel or copper wool may be a good choice for use in the volume absorber. In further embodiments, additional tapered structures (ex.—more than two tapered structures) may be used inside the enclosure 700 to enhance light absorption and/or to prevent light from re-entering the fiber 708.

Surface temperature of the enclosure 700 may increase to over 50 degrees Celsius when high light levels are being implemented and when a surface area of the enclosure is small. By increasing an external surface area of the enclosure 700, the temperature of the enclosure may be greatly reduced. In further embodiments, the enclosure 700 may be cooled through implementation of a fan, a heat pipe cooler, a thermoelectric cooler, and/or via liquid cooling. Because the enclosure 700 may be implemented in a system in which said enclosure 700 may be located remotely from a laser or remote head, it may be much easier to implement cooling without impacting the performance of the laser. Still further, cooling can also be done without photocontamination problems.

Figure 8:
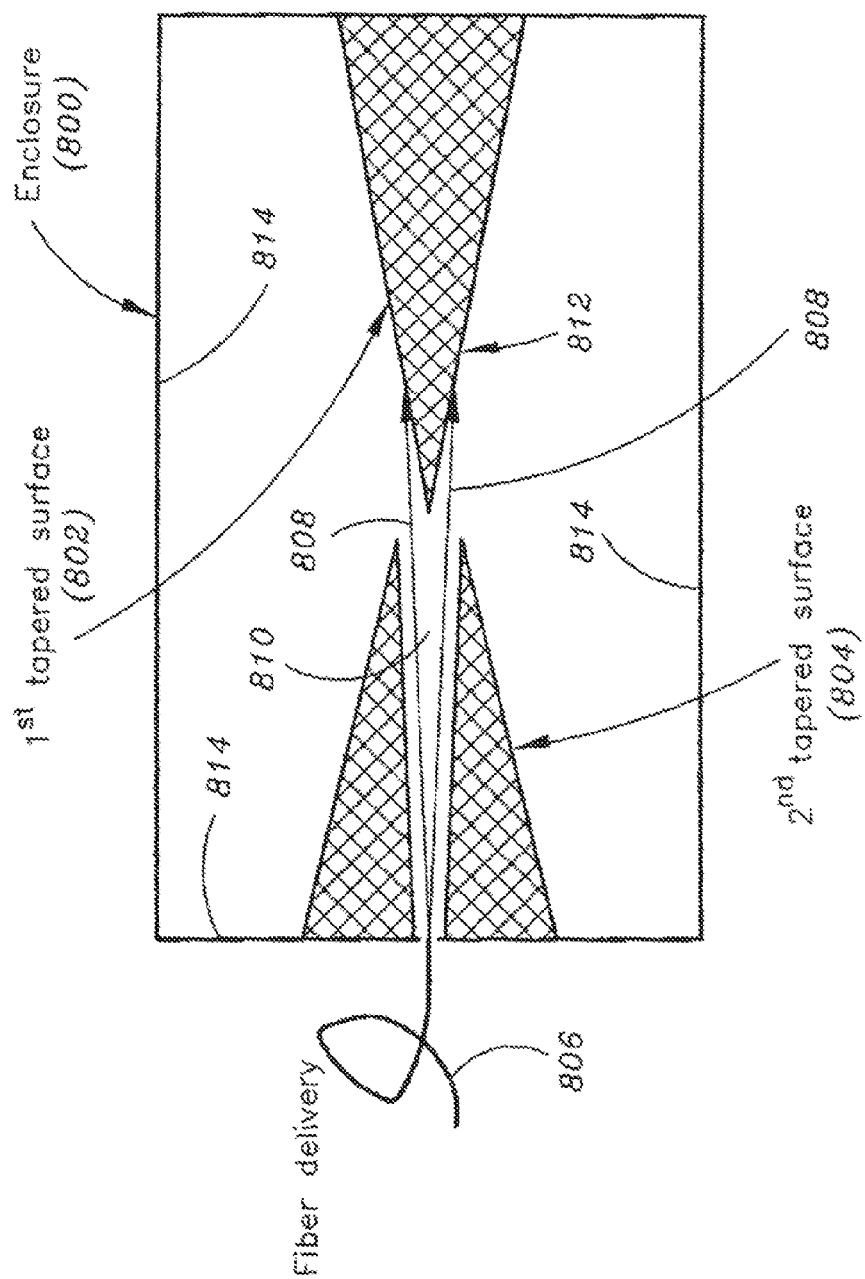
FIG. 8 is a block diagram schematic of a beam dump enclosure in accordance with a further exemplary embodiment of the present disclosure, the beam dump enclosure including multiple tapered structures and being configured for receiving reduced Numerical Aperture (NA) light via fiber delivery.

Referring to FIG. 8, a remote enclosure (ex.—beam dump) 800 in accordance with a further exemplary embodiment of the present disclosure is shown. In exemplary embodiments, enclosure 800 may include a first tapered structure (ex.—a first tapered surface) 802 and a second tapered structure (ex.—a second tapered surface) 804, said enclosure 800 being configured for receiving reduced numerical aperture (NA) light 808 provided to the enclosure 800 by fiber delivery (ex.—via optical fiber 806). In further embodiments of the present disclosure, the fiber 806 may be connected to the enclosure 800 via a standard fiber connector.

In exemplary embodiments, the enclosure 800 may be constructed of a variety of materials including but not limited to metals. For instance, extruded aluminum may be a good choice as a material for the enclosure 800 because it may allow for construction of the enclosure 800 to be very inexpensive. In exemplary embodiments, an internal area of the enclosure 800 may be greater than 1,000 times the area of a fiber output surface. For example, the internal area of the enclosure 800 may be greater than 1,000,000 times the area of the fiber output surface. Light 808 exiting fiber 806 may diverge and pass through one or more aperture(s) 810 in the second tapered structure (ex.—second tapered surface) 804 and may impinge on (ex.—may contact) the first tapered structure (ex.—first tapered surface) 802. The addition of the second tapered surface 804 in this embodiment reduces an amount of the light 808 which may be scattered and reflected back into fiber 806.

The one or more aperture(s) 810 formed in the second tapered surface 804 of the enclosure 800 may be optimized (ex.—may be configured to have smaller diameters than the aperture(s) of tapered structures implemented in other enclosure embodiments disclosed herein) to promote the suitability of the second tapered surface 804 for implementation in an enclosure 800 receiving lower NA light 808. The addition of the second tapered surface 804 reduces the amount of the light 808 that can be scattered and reflected back into fiber 806. The light 808 may then impinge on the first tapered surface 802. In exemplary embodiments of the present disclosure, the second tapered structure 804 may be configured such that the light 808, upon exiting the second tapered structure 804 may have a smaller angle of divergence (ex.—a smaller amount of beam divergence) compared with an angle of divergence of light 706 exiting the second tapered structure 704 of enclosure 700. As a result, for the enclosure 800 depicted in FIG. 8, the amount of surface area of the first tapered structure 802 which is impinged upon by the light 808 may be greater than the amount of surface area of the first tapered structure 702 which is impinged upon by the light 706 in the enclosure 700 depicted in FIG. 7. In further embodiments, a distance between the light exiting portion 810 of the second tapered structure 804 and a small portion (ex.—tip portion) 812 of the first tapered structure 804 should be optimized to reduce scattered and reflected light from the enclosure 800 re-entering fiber 806.

As mentioned above, once the light 808 passes through an aperture 810 formed in the second tapered surface 804, the light 808 may impinge on the first tapered surface 802. In exemplary embodiments, the first tapered surface 802 may be designed to spread as much of the incident light power as possible over its (ex.—the first tapered surface's) surface area. This may help to reduce power density and potential damage to the first tapered structure (ex.—first tapered surface) 802. When implementing light 808 which is high-powered light, it may be desirable to have the first tapered surface 802 be constructed of a material with high thermal conductivity such as copper, aluminum or an alloy containing one or more of these materials. Another material which may be used in constructing the first tapered structure 802 may be stainless steel, however, the thermal conductivity of stainless steel is much less than either copper or aluminum.

In exemplary embodiments of the present disclosure, when implementing light 808 which is high-powered light, it may be desirable to have the first tapered surface 802 reflect a substantial portion of the incident light 808. This may prevent damage to the surface of the first tapered structure (ex.—tapered element) 802. For example, by coating the first tapered surface 802 with nickel, a substantial portion of the incident light 808 may be reflected and thus, damage to the surface of the first tapered structure 802 may be prevented. In further embodiments, it is also possible for the first tapered surface 802 to have (ex.—to be configured for and/or to be constructed for providing) enhanced light scattering. Creating a tapered surface 802 which provides enhanced light scattering may be accomplished by bead blasting or using some other technique to increase the roughness of the tapered surface 802. In still further embodiments, the first tapered surface 802 may be constructed so as to be a light absorbing surface. However, this is generally only recommended when low power light is being implemented.

In embodiments of the present disclosure, when the light 808 scatters from and reflects off of the first tapered surface 802, said light 808 may contact interior surface(s) 814 of the enclosure 800. In an embodiment of the present disclosure, the interior surface(s) 814 of the enclosure 800 may be formed of bare metal, metal with enhanced surface roughness, or metal coated with an absorber. In further embodiments, a volume absorber may be positioned inside the enclosure 800. For instance, the volume absorber may be a liquid, glass, or mesh structure. When the light 808 being implemented is infrared wavelength light, water may be a good choice for a volume absorber which is a liquid structure (ex.—a liquid volume absorber). In further embodiments, specialty glass types may be implemented in the volume absorber which may be suitable for absorbing a variety of wavelengths. In still further embodiments, steel or copper wool may be a good choice for use in the volume absorber. In exemplary embodiments, the second tapered structure 804 may be made from similar materials and have similar coatings as the first tapered structure 802. It may be preferable for the second tapered structure 804 and the surfaces forming the aperture(s) 810 in the second tapered structure 804 to be absorbing. In further embodiments, additional tapered structures (ex.—more than two tapered structures) may be used inside the enclosure 800 to enhance light absorption and/or to prevent light from re-entering the fiber 806.

In exemplary embodiments of the present disclosure, surface temperature of the enclosure 800 may increase to over 50 degrees Celsius when high light levels are being implemented and when a surface area of the enclosure is small. By increasing an external surface area of the enclosure 800, the temperature of the enclosure may be greatly reduced. In further embodiments, the enclosure 800 may be cooled through implementation of a fan, a heat pipe cooler, a thermoelectric cooler, and/or via liquid cooling. Because the enclosure 800 may be implemented in a system in which said enclosure 800 may be located remotely from a laser or remote head, it may be much easier to implement cooling without impacting the performance of the laser. Still further, cooling can also be done without photocontamination problems.

Figure 9:
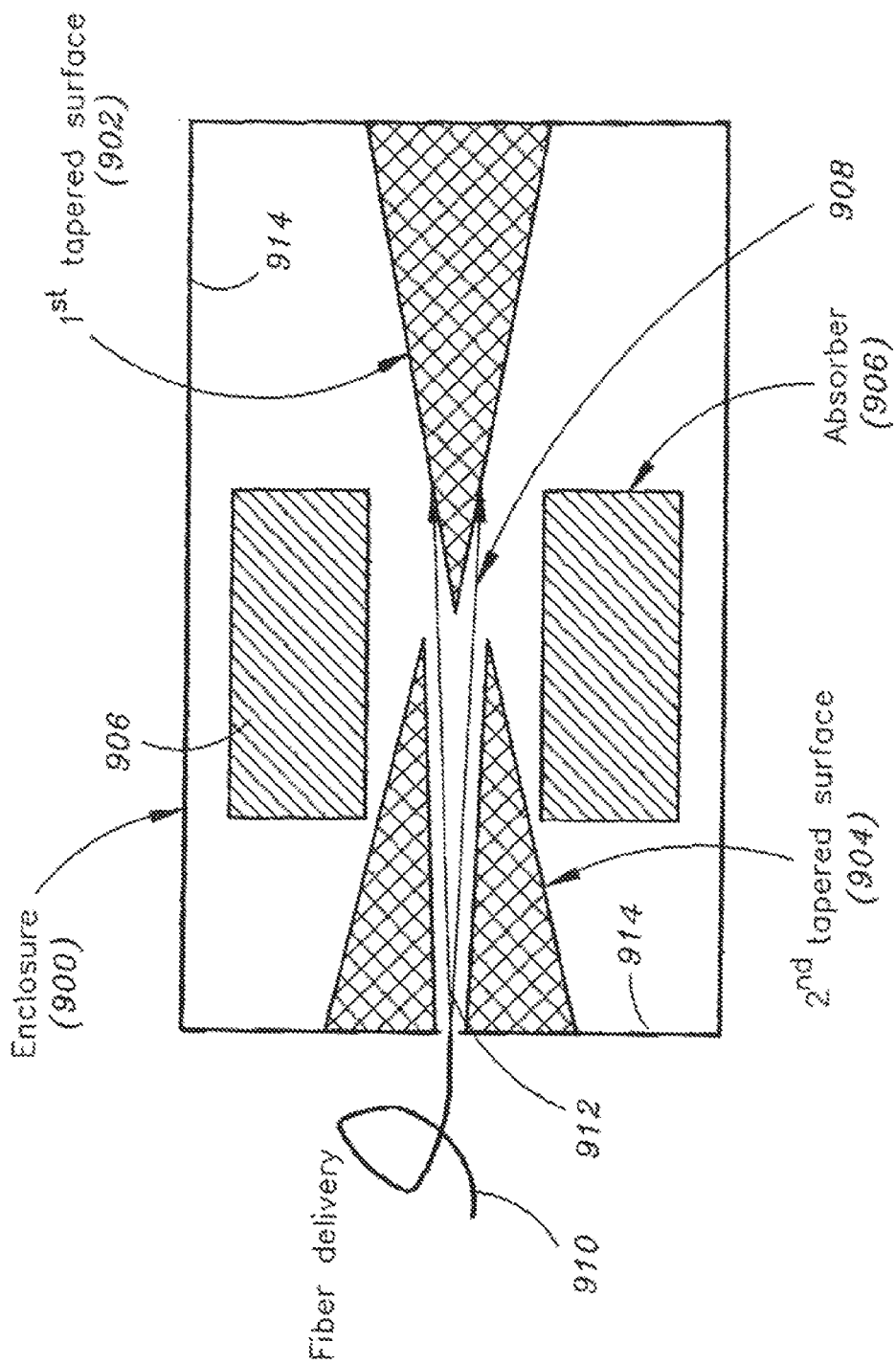
FIG. 9 is a block diagram schematic of a beam dump enclosure in accordance with a further exemplary embodiment of the present disclosure, the beam dump enclosure including fiber delivery, multiple tapered structures and volume absorber(s)

Referring to FIG. 9, a remote enclosure (ex.—beam dump) 900 in accordance with a further exemplary embodiment of the present disclosure is shown. In exemplary embodiments, enclosure 900 may include a first tapered structure (ex.—a first tapered surface) 902, a second tapered structure (ex.—a second tapered surface) 904 and a volume absorber(s) 906. The enclosure 900 may be configured for receiving light 908 provided to the enclosure 900 by fiber delivery (ex.—via optical fiber 910). In further embodiments of the present disclosure, the fiber 910 may be connected to the enclosure 900 via a standard fiber connector.

In exemplary embodiments, the enclosure 900 may be constructed of a variety of materials including but not limited to metals. For instance, extruded aluminum may be a good choice as a material for the enclosure 900 because it may allow for construction of the enclosure 900 to be very inexpensive. In exemplary embodiments, an internal area of the enclosure 900 may be greater than 1,000 times the area of a fiber output surface. For example, the internal area of the enclosure 900 may be greater than 1,000,000 times the area of the fiber output surface. Light 908 exiting fiber 910 may diverge and pass through an aperture 912 formed by/formed through/formed in the second tapered structure (ex.—second tapered surface) 904 and may impinge on (ex.—may contact) the first tapered structure (ex.—first tapered surface) 902. The addition of the second tapered surface 904 in this embodiment reduces an amount of the light 908 which may be scattered and reflected back into fiber 910.

As mentioned above, once the light 908 passes through aperture 912 formed in the second tapered surface 904, the light 908 may impinge on the first tapered surface 902. In further embodiments, a distance between the light exiting portion of the second tapered surface 904 and the first tapered surface 902 should be optimized to reduce scattered and reflected light from the enclosure 900 re-entering fiber 910. In exemplary embodiments, the first tapered surface 902 may be designed to spread as much of the incident light power as possible over its (ex.—the first tapered surface's) surface area. This may help to reduce power density and potential damage to the first tapered structure (ex.—first tapered surface) 902. When implementing light 908 which is high-powered light, it may be desirable to have the first tapered surface 902 be constructed of a material with high thermal conductivity such as copper, aluminum or an alloy containing one or more of these materials. Another material which may be used in constructing the first tapered structure 902 may be stainless steel, however, the thermal conductivity of stainless steel is much less than either copper or aluminum.

In exemplary embodiments of the present disclosure, when implementing light 908 which is high-powered light, it may be desirable to have the first tapered surface 902 reflect a substantial portion of the incident light 908. This may prevent damage to the surface of the first tapered structure (ex.—tapered element) 902. For example, by coating the first tapered surface 902 with nickel, a substantial portion of the incident light 908 may be reflected and thus, damage to the surface of the first tapered structure 902 may be prevented. In further embodiments, it is also possible for the first tapered surface 902 to have (ex.—to be configured for and/or to be constructed for providing) enhanced light scattering. Creating a tapered surface 902 which provides enhanced light scattering may be accomplished by bead blasting or using some other technique to increase the roughness of the tapered surface 902. In still further embodiments, the first tapered surface 902 may be constructed so as to be a light absorbing surface. However, this is generally only recommended when low power light is being implemented.

In embodiments of the present disclosure, when the light 908 scatters from and reflects off of the first tapered surface 902, said light 908 may contact interior surface(s) 914 of the enclosure 900. In an embodiment of the present disclosure, the interior surface(s) 914 of the enclosure 900 may be formed of bare metal, metal with enhanced surface roughness, or metal coated with an absorber. In further embodiments, volume absorber(s) 906 may be positioned inside the enclosure 900 to increase light absorption. For instance, the volume absorber(s) 906 may be liquid, glass, or mesh structure(s). When the light 908 being implemented is infrared wavelength light, water may be a good choice for a volume absorber which is a liquid structure (ex.—a liquid volume absorber). In further embodiments, specialty glass types may be implemented in the volume absorber which may be suitable for absorbing a variety of wavelengths. In still further embodiments, steel or copper wool may be a good choice for use in the volume absorber. In exemplary embodiments, the second tapered structure 904 may be made from similar materials and may have similar coatings as the first tapered structure 902. It may be preferable for the second tapered structure 904 and the surfaces forming the aperture 912 in the second tapered structure 904 to be absorbing. In further embodiments, additional tapered structures (ex.—more than two tapered structures) may be used inside the enclosure 900 to enhance light absorption and/or to prevent light from re-entering the fiber 910.

In exemplary embodiments, the second tapered structure 904 may be made from similar materials and may have similar coatings as the first tapered structure 902. It may be preferable for the second tapered structure 904 and the surfaces forming the aperture 912 in the second tapered structure 904 to be absorbing. In further embodiments, additional tapered structures (ex.—more than two tapered structures) may be used inside the enclosure 900 to enhance light absorption and/or to prevent light from re-entering the fiber 910.

In embodiments of the present disclosure, surface temperature of the enclosure 900 may increase to over 50 degrees Celsius when high light levels are being implemented and when a surface area of the enclosure is small. By increasing an external surface area of the enclosure 900, the temperature of the enclosure may be greatly reduced. In further embodiments, the enclosure 900 may be cooled through implementation of a fan, a heat pipe cooler, a thermoelectric cooler, and/or via liquid cooling. Because the enclosure 900 may be implemented in a system in which said enclosure 900 may be located remotely from a laser or remote head, it may be much easier to implement cooling without impacting the performance of the laser. Still further, cooling can also be done without photocontamination problems.

Figure 10:
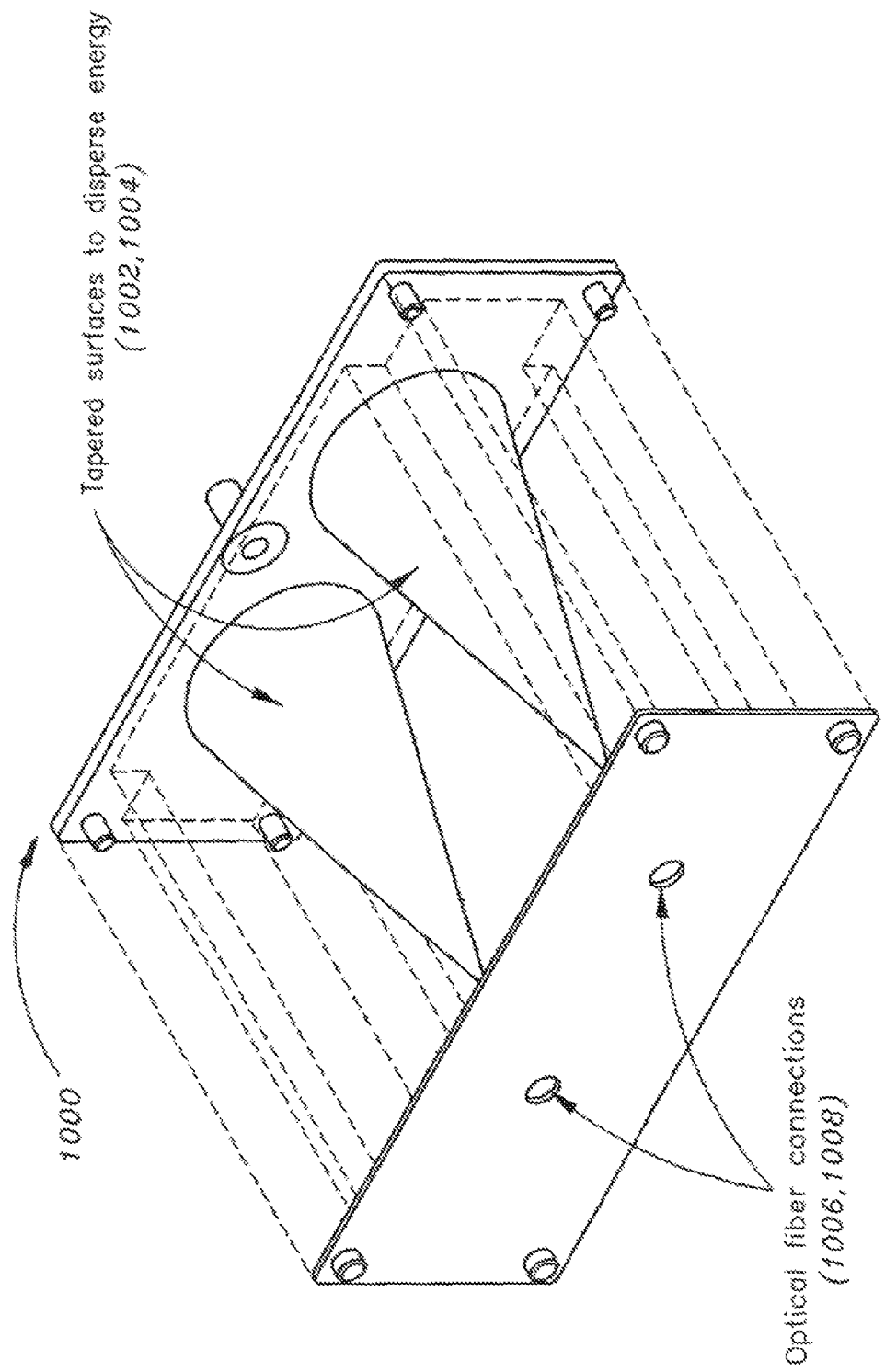
FIG. 10 is a block diagram schematic of a beam dump enclosure in accordance with a further exemplary embodiment of the present disclosure, the beam dump enclosure including dual-fiber fiber delivery and multiple tapered structures.

Referring to FIG. 10, a remote enclosure (ex.—beam dump) 1000 in accordance with a further exemplary embodiment of the present disclosure is shown. In exemplary embodiments, enclosure 1000 may include a first tapered structure 1002 and a second tapered structure 1004. The enclosure 1000 may be configured for receiving light provided to the enclosure 1000 by fiber delivery via optical fibers (not shown). In further embodiments of the present disclosure, the fibers may be connected to the enclosure 1000 via standard fiber connectors at locations (1006, 1008). In exemplary embodiments, the enclosure 1000 may be constructed of a variety of materials including but not limited to metals. For instance, extruded aluminum may be a good choice as a material for the enclosure 1000 because it may allow for construction of the enclosure 1000 to be very inexpensive. In exemplary embodiments, an internal area of the enclosure 1000 may be greater than 1,000 times the area of a fiber output surface connected to the enclosure 1000. For example, the internal area of the enclosure 1000 may be greater than 1,000,000 times the area of the fiber output surface. Light entering the enclosure 1000 via optical fiber connections at locations (1006, 1008) may diverge and impinge on (ex.—may contact) the tapered structures (ex.—tapered surfaces) 1002, 1004.

In exemplary embodiments, the tapered surfaces (1002, 1004) may be constructed of nickel coated aluminum. In further embodiments, the enclosure 1000 may be implemented with a frequency converted laser (such as frequency converted laser 301 shown in FIG. 3) to contain residual light of different wavelengths. Light that scatters and reflects from tapered surfaces (1002, 1004) may contact interior surface(s) of the enclosure 1000. In embodiments of the present disclosure, the interior surface(s) of the enclosure 1000 may be formed of bare aluminum.

In further embodiments, a surface temperature of the enclosure 1000 may be less than 40 deg C. when the enclosure is implemented with a 40 W laser, thus the enclosure 1000 doesn't require any external cooling. In still further embodiments, the enclosure 100 may utilize a heat pipe cooler mounted to an external surface of the enclosure 1000, thereby providing a low cost cooling option.

Figure 11:
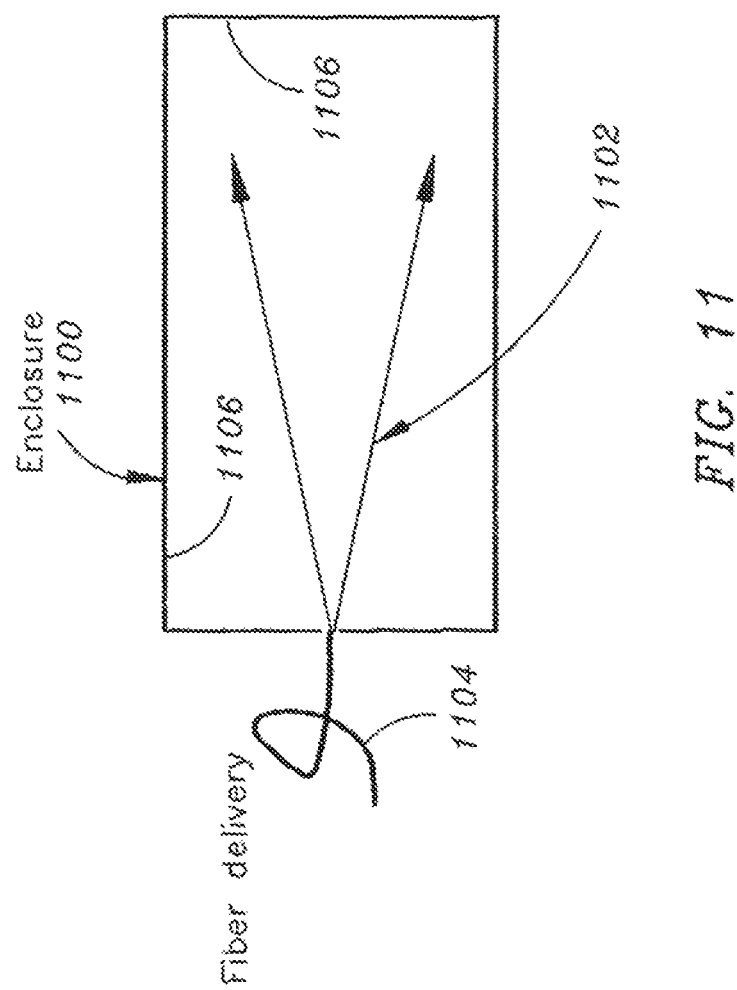
FIG. 11 is a block diagram schematic of a beam dump enclosure in accordance with a further exemplary embodiment of the present disclosure, the beam dump enclosure including fiber delivery.

Referring to FIG. 11, a remote enclosure (ex.—beam dump) 1100 in accordance with a further exemplary embodiment of the present disclosure is shown. In exemplary embodiments, enclosure 1100 may be configured for receiving light 1102 provided to the enclosure 1100 by fiber delivery (ex.—via optical fiber 1104). In further embodiments of the present disclosure, the fiber 1104 may be connected to the enclosure 1100 via a standard fiber connector.

In exemplary embodiments, the enclosure 1100 may be constructed of a variety of materials including but not limited to metals. For instance, extruded aluminum may be a good choice as a material for the enclosure 1100 because it may allow for construction of the enclosure 1100 to be very inexpensive. In exemplary embodiments, an internal area of the enclosure 1100 may be greater than 1,000 times the area of a fiber output surface. For example, the internal area of the enclosure 1100 may be greater than 1,000,000 times the area of the fiber output surface. Light 1102 exiting fiber 1104 may diverge and impinge on (ex.—may contact) an internal surface 1106 of the enclosure 1100. The internal surface 1106 of the enclosure 1100 may be configured for reflecting a substantial portion of the incident light 1102, thereby minimizing damage to the internal surface 1106. For instance, the internal surface 1106 may be coated with nickel.

In embodiments of the present disclosure, the internal surface 1106 may be configured for providing enhanced light scattering. This can be accomplished by bead blasting or using some other technique to increase the roughness of the surface. It is also possible for the internal surface 1104 to be absorbing, however this is only recommended for low power light. Light that scatters and reflects from surface 1104 will hit the inside of enclosure 1100. In exemplary embodiments, the internal surface of enclosure 1100 may be formed of bare metal, metal with enhanced surface roughness, or metal coated with an absorber. In further embodiments, volume absorber(s) may be placed (ex.—implemented) inside the enclosure 1102. For instance, the volume absorber(s) may be liquid, glass, or mesh structure(s). When the light 1102 being implemented is infrared wavelength light, water may be a good choice for a volume absorber which is a liquid structure (ex.—a liquid volume absorber). In further embodiments, specialty glass types may be implemented in the volume absorber(s) which may be suitable for absorbing a variety of wavelengths. In still further embodiments, steel or copper wool may be a good choice for use in the volume absorber(s). In further embodiments, one or more tapered structures (ex.—more than two tapered structures) may be used inside the enclosure 1100 to enhance light absorption and/or to prevent light from re-entering the fiber 1104.

In exemplary embodiments of the present disclosure, surface temperature of the enclosure 1100 may increase to over 50 degrees Celsius when high light levels (ex.—high energy light levels) are being implemented and when a surface area of the enclosure is small. By increasing an external surface area of the enclosure 1100, the temperature of the enclosure may be greatly reduced. In further embodiments, the enclosure 1100 may be cooled through implementation of a fan, a heat pipe cooler, a thermoelectric cooler, and/or via liquid cooling. Because the enclosure 1100 may be implemented in a system in which said enclosure 1100 may be located remotely from a laser or remote head, it may be much easier to implement cooling without impacting the performance of the laser. Still further, cooling can also be provided for the enclosure 1100 without photocontamination problems.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A beam dump, comprising:
    an enclosure, the enclosure connectable to at least one optical fiber, the enclosure including an aperture for receiving light into an interior of the enclosure from a remotely-located light source via at least one optical fiber;
    a first tapered structure, a portion of the first tapered structure disposed on a first internal surface of the enclosure;
    a second tapered structure, a portion of the second tapered structure disposed on a second internal surface of the enclosure opposite the first internal surface of the enclosure, an exterior wall of the first tapered structure and an exterior wall of the second tapered structure located within the interior of the enclosure,
    an apex of the first tapered structure and an aperture of the second tapered structure aligned so that the light received by the enclosure passes through the aperture of the second tapered structure and impinges on at least the apex of the first tapered structure; and at least one solid volume absorber, the at least one solid volume absorber located within the interior of the enclosure and substantially surrounding a volume between the first tapered structure and the second tapered structure, the at least one solid volume absorber configured for absorbing the light.

2. A beam dump as claimed in claim 1, wherein the enclosure is an opaque enclosure.

3. A beam dump as claimed in claim 1, wherein the enclosure is formed of extruded aluminum.

4. A beam dump as claimed in claim 1, wherein the received light includes at least one of residual pump light from a laser oscillator, residual pump light from an amplifier or residual light from a frequency-conversion process.

5. A beam dump as claimed in claim 1, wherein the received light impinges on an internal surface of the enclosure.

6. A beam dump as claimed in claim 1, further comprising:
a cooling structure, the cooling structure being connected to an external surface of the enclosure, the cooling structure configured for decreasing a surface temperature of the enclosure.

7. A beam dump as claimed in claim 5, wherein the internal surface is configured for at least one of reflecting the impinging light, scattering the impinging light or absorbing the impinging light.

8. A beam dump as claimed in claim 5, wherein the internal surface of the enclosure includes at least one a portion that is roughened, a portion that is bead-blasted, a metal portion or a portion that is coated with a light-absorbing material.

9. A beam dump as claimed in claim 1, wherein at least one of the first tapered structure or the second tapered structure is formed of at least one of a thermally-conductive material, aluminum, copper, stainless steel, a metal alloy, carbon or graphite.

10. A beam dump as claimed in claim 1, wherein at least one of the first tapered structure or the second tapered structure is at least partially coated with at least one of metal, nickel, silver or gold.

11. A beam dump as claimed in claim 1, wherein at least one of the first tapered structure or the second tapered structure includes at least one of a roughened surface or a bead-blasted surface.

12. A beam dump as claimed in claim 1, wherein at least one of the first tapered structure or the second tapered structure is at least one of a multi-sided structure or a conical structure.

13. A beam dump as claimed in claim 1, wherein the at least one solid volume absorber is at least one of an absorber formed of glass, an absorber formed of mesh, an absorber formed of steel wool or an absorber formed of copper wool.

14. A beam dump as claimed in claim 6, wherein the cooling structure includes at least one of a fan, a heat pipe cooling structure, a thermoelectric cooling structure, heat-radiating fins, or a liquid cooling structure.

15. A beam dump as claimed in claim 1, wherein the aperture of the second tapered structure is sized for causing the light to pass through the second tapered structure at a selected angle of divergence.

16. A laser system, comprising:
at least one remotely located laser;
at least one optical fiber;
an enclosure, the enclosure connectable to the at least one optical fiber, the enclosure including an aperture for receiving light into an interior of the enclosure from a remotely-located light source via the at least one optical fiber and
a first tapered structure, a portion of the first tapered structure disposed on a first internal surface of the enclosure; and
a second tapered structure, a portion of the second tapered structure disposed on a second internal surface of the enclosure opposite the first internal surface of the enclosure, an exterior wall of the first tapered structure and an exterior wall of the second tapered structure located within the interior of the enclosure,
an apex of the first tapered structure and an aperture of the second tapered structure aligned so that the light received by the enclosure passes through the aperture of the second tapered structure and impinges on at least the apex of the first tapered structure; and
at least one solid volume absorber, the at least one solid volume absorber located within the interior of the enclosure and substantially surrounding a volume between the first tapered structure and the second tapered structure, the at least one volume absorber configured for absorbing the light.

17. A beam dump, comprising:
an enclosure, the enclosure connectable to at least one optical fiber, the enclosure including an aperture for receiving light into an interior of the enclosure from a remotely-located light source via at least one optical fiber;
a first tapered structure, a portion of the first tapered structure disposed on a first internal surface of the enclosure; and
a second tapered structure, an exterior wall of the first tapered structure and an exterior wall of the second tapered structure located within the interior of the enclosure,
an apex of the first tapered structure and an aperture of the second tapered structure aligned so that the light received by the enclosure passes through the aperture of the second tapered structure and impinges on at least the apex of the first tapered structure;
at least one solid volume absorber, the at least one solid volume absorber located within the interior of the enclosure and substantially surrounding a volume between the first tapered structure and the second tapered structure, the at least one solid volume absorber configured for absorbing the light.

* * * * *